Aug. 31, 1937.  J. H. STAAK  2,091,838
LIQUID DISPENSER
Filed Feb. 1, 1936
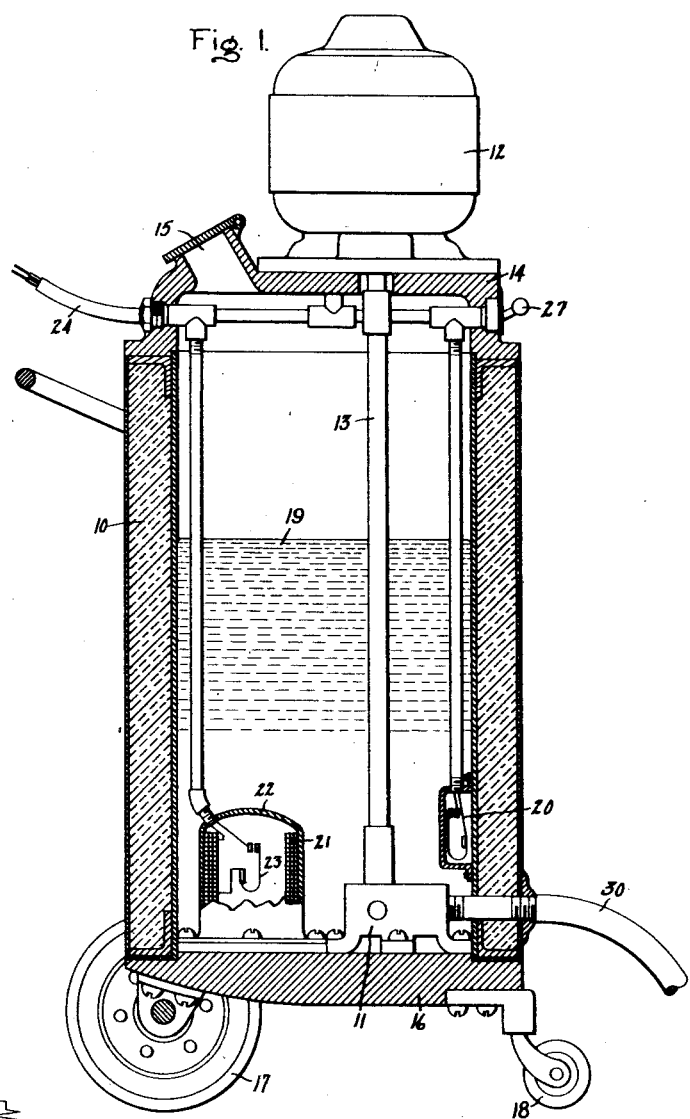
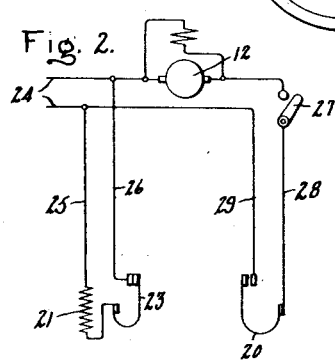
Inventor:
Julius H. Staak,
by Harry E. Dunham
His Attorney.

Patented Aug. 31, 1937

2,091,838

UNITED STATES PATENT OFFICE 2,091,838

LIQUID DISPENSER

Julius H. Staak, Fort Wayne, Ind., assignor to General Electric Company, a corporation of New York Application February 1, 1936, Serial No. 61,950

1 Claim. (Cl. 219—39)

My invention relates to liquid dispensers, and more particularly to temperature control apparatus for liquid containers or dispensers.

One application for my invention is in portable flushing apparatus, such as is commonly used for servicing internal combustion engines. The liquid used therein, usually kerosene, is inflammable wherefore its highest temperature must not exceed a predetermined value. However, it must be kept at a sufficiently high temperature so that it will dissolve accumulated grease when it is used for flushing gear cases, crank cases or other machine parts.

One object of my invention is to provide an improved temperature control apparatus whereby the fluid temperature may be kept within predetermined limits.

For a better understanding of my invention, together with other and further objects thereof, reference is had to the following description, taken in connection with the accompanying drawing, and its scope will be pointed out in the appended claim.

In the accompanying drawing I illustrate one embodiment of my invention. Fig. 1 illustrates a cross-sectional elevation of a portable flushing apparatus, the liquid container of which is equipped with temperature control apparatus built in accordance with my invention. Fig. 2 is a diagram of connections for the heat control apparatus.

Referring to Fig. 1 in detail, I have illustrated in cross-section a container, or tank 10, provided with a pump 11 driven by a motor 12 through a shaft 13. The motor 12 is mounted on a cover 14 for the tank which is provided with an inlet opening 15. The tank is mounted on a base 16 provided with wheels 17 and 18, so that it may be easily moved. The tank 10 contains a flushing fluid 19, such as kerosene, for example, which must be normally kept at a temperature high enough to dissolve the grease and at the same time, it being inflammable, must not be locally overheated. For this purpose I have provided a thermostat 20 connected in a circuit of the motor 12 which closes the circuit to the motor only when the temperature of the flushing fluid 19 is high enough. I also provide a heater 21 mounted in an auxiliary tank or casing 22 within the tank 10. This heater is made in the shape of a hollow coil, the outside of which is in contact with the inner wall of the auxiliary tank 22, and a thermostat 23 connected in the circuit of the heater is mounted within the heating coil and auxiliary tank. When the flushing apparatus is connected to a source of current through its flexible cord 24, a current is fed to the heating coil through conductors 25 and 26. The thermostat 23 being within the auxiliary tank and inside of the heating coil, is exposed to the hottest portion of the heating coil and therefore responds to the highest temperature in the coil. The thermostat is adjusted to open at a temperature which is considered to be safe for the fluid to be heated and therefore opens not in response to the temperature of the fluid but in response to the temperature within the coil. In this manner the heat from the coil is permitted to slowly dissipate into the fluid and thereby raise its temperature, which temperature is at no point higher than that permitted by the thermostat 23. A switch 27 is connected in a circuit of the motor and may be operated to start the motor. Thermostat 20, however, is in series with this switch 27 through conductors 28 and 29, and will not allow operation of the motor until the temperature of the fluid 19 is high enough. In this manner the temperature of the fluid, as delivered for external use, is controlled both at its lower and its upper limit. A flexible hose 30, attached to the discharge end of the pump 11, facilitates the use of the flushing liquid.

Although I have described my invention as applied to a flushing apparatus, it will be evident that my invention may with equal advantage, be applied to any fluid or liquid containers or dispensers wherein an accurate temperature of the contents is desired.

What I claim as new and desire to secure by Letters Patent of the United States, is:—

In a portable flushing apparatus, the combination of a liquid container provided with a cover, a motor mounted on said cover, a pump mounted in said container and driven by said motor for removing liquid from said container, a thermostat in the circuit of said motor arranged to respond to the temperature of liquid in said container and operable to open the circuit to said motor when the liquid temperature is below a predetermined value, a casing in said container, a heater in said casing comprising a heating coil having its outside surface in contact with the interior of said casing whereby the heat from said coil is dissipated through said casing wall into the liquid in the container, and a thermostat mounted in the center of said heater coil operable to shut off said heater at a predetermined temperature whereby the heater is controlled responsive to its own highest temperature.

JULIUS H. STAAK.